US008731697B2

(12) United States Patent
Park

(10) Patent No.: US 8,731,697 B2
(45) Date of Patent: May 20, 2014

(54) JOB ASSIGNMENT APPARATUS OF AUTOMATIC MATERIAL-HANDLING SYSTEM AND METHOD THEREOF

(75) Inventor: Tae-Eun Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1553 days.

(21) Appl. No.: 11/771,206

(22) Filed: Jun. 29, 2007

(65) Prior Publication Data

US 2008/0071404 A1    Mar. 20, 2008

(30) Foreign Application Priority Data

Sep. 19, 2006    (KR) ........................ 10-2006-0090873

(51) Int. Cl.
*G06F 19/00*    (2011.01)

(52) U.S. Cl.
USPC ............. 700/100; 705/7.14; 706/46; 716/129

(58) Field of Classification Search
CPC ......... G06F 17/06; G06F 17/50; G06F 17/60; G06B 2219/45031; G05B 19/41865; G06N 5/02; G06N 5/04; G06Q 10/06; G06Q 10/087; G06Q 30/02
USPC ............. 700/100; 705/7.14; 706/46; 716/132
See application file for complete search history.

(56) References Cited

U.S. PATENT DOCUMENTS 5,648,912 A * 7/1997 Narayanan et al. ........... 716/129
5,963,911 A * 10/1999 Walker et al. ................. 705/7.12
6,578,005 B1 * 6/2003 Lesaint et al. ............... 705/7.14
7,664,561 B1 * 2/2010 Chen et al. .................... 700/101
2008/0140597 A1 * 6/2008 Satir et al. ........................ 706/46

FOREIGN PATENT DOCUMENTS

| JP | 05-073142 | 3/1993 |
| JP | 5073142 | 3/1993 |
| JP | 2002-299412 | 10/2002 |
| JP | 2005506581 | 3/2005 |
| KR | 2005-2692 | 1/2005 |
| WO | 2005/114500 | 1/2005 |

OTHER PUBLICATIONS

IBM Technical Disclosure Bulletin NN73012661, Heuristic Algorithm for solving the linear assignment problem, Jan. 1973.*
Japanese Office Action issued May 25, 2010 in JP Application No. 2007-202785.
Korean Office Action issued in application No. 10-2006-0090873 dated Aug. 21, 2012.
Alan Holland et al., "Fast Vickrey-Pricing for the Assignment Problem", Proc. of ERCIM/CologNet International Workshop on Constraint Solving and Constraint Logic Programming, 2003.
Korean Office Action dated Aug. 21, 2012 issued in KR Application No. 2006-0090873.

* cited by examiner

*Primary Examiner* — Kavita Padmanabhan
*Assistant Examiner* — Douglas Lee
(74) *Attorney, Agent, or Firm* — Stanzione & Kim, LLP

(57) ABSTRACT

A job assignment apparatus of an automatic material-handling apparatus to calculate an initial optimum solution based on a cost table configured by the job assignment, and to calculate a single optimum solution based on the cost table converted by statistical data. The Hungarian algorithm is stored in a tool storage unit to calculate the optimum solution. A statistical-data calculator calculates statistical data to convert costs of the initial cost table into other costs. The cost-table converter converts the costs of the initial cost table based on the calculated statistical data.

15 Claims, 6 Drawing Sheets

JOB ASSIGNMENT APPARATUS OF AUTOMATIC MATERIAL-HANDLING SYSTEM AND METHOD THEREOF

CROSS-REFERENCE TO RELATED APPLICATIONS

This application claims the benefit priority under 35 U.S.C. §119(a) from Korean Patent Application No. 2006-0090873, filed on Sep. 19, 2006 in the Korean Intellectual Property Office, the disclosure of which is incorporated herein in its entirety by reference.

BACKGROUND OF THE INVENTION

1. Field of the Invention

The present general inventive concept relates to a job assignment apparatus of an automatic material-handling apparatus to optimally assign a plurality of jobs to a plurality of vehicles using the Hungarian method of calculating an optimum solution of a matrix, and a method thereof.

2. Description of the Related Art

An equipment control process for controlling complicated equipment such as a semiconductor- or LCD-fabrication process is configured by interconnection of a variety of automatic material-handling systems (e.g., a plurality of stockers, an OHT (Overhead Hoist Transport System), a OHS (Overhead Shuttle System), a RGV (Rail Guided Vehicle) system, and a AGV (Automatic Guided Vehicle) system), such that the material handling between the fabrication devices is implemented. The above-mentioned material-handling systems are controlled by their handling control systems.

The most important function of the control system is to optimally assign a plurality of jobs to a plurality of vehicles.

Generally, with the increasing capacity of the equipment fabrication process, the number of vehicles of the equipment fabrication process is greater than the number of jobs of the equipment fabrication process.

The above-mentioned problem of assigning a plurality of jobs to a plurality of vehicles is considered to be an NP-hard (Non-deterministic Polynomial-time hard), such that it is impossible to solve the problem by arranging all the cases.

There are a variety of conventional methods for assigning a plurality of jobs to a plurality of vehicles, for example, a priority-based assignment method, a job assignment method closest to the vehicle, an idle assignment method, and a heuristic assignment method, etc.

Indeed, most systems have difficulty in employing the above-mentioned conventional methods, and have been limited to provide only a local optimum solution of a specific range, instead of a global optimum solution.

SUMMARY OF THE INVENTION

The present general inventive concept provides a job assignment apparatus of an automatic material-handling apparatus capable of calculating an initial optimum solution from a cost table configured by the job assignment, and calculating a single optimum solution from the cost table converted by statistical data, and a method thereof.

Additional aspects and/or utilities of the present general inventive concept will be set forth in part in the description which follows and, in part, will be obvious from the description, or may be learned by practice of the general inventive concept.

The foregoing and/or other aspects and utilities of the present general inventive concept are achieved by providing a job assignment apparatus to use in an automatic material-handling system to assign a plurality of jobs to a plurality of vehicles, including a cost-table composer to configure a cost table using costs corresponding to the vehicles and the jobs, and an optimum solution calculator to calculate an optimum solution by applying a Hungarian algorithm to the costs of the cost table.

The apparatus may further include a tool storage unit to store the Hungarian algorithm.

The cost-table composer may configure the cost table if the following equation is satisfied:

$$\text{Minimize} \sum_{i=1}^{N} \sum_{j=1}^{M} C_{ij} x_{ij}$$

Subject to $$\sum_{i=1}^{N} x_{ij} = 1$$

$$\sum_{j=1}^{M} x_{ij} = 1$$

$$x_{ij} = 0, 1 \quad i = 1, \ldots, N, \; j = 1, \ldots, M$$

where $C_{ij}$ represents a cost of a vehicle (i) that is assigned to a job (j), $x_{ij}$ represents the vehicle (i) that is assigned to the job (j), N represents a number of vehicles, and M represents a number of jobs.

The cost-table composer may allow a number of rows of the cost table to be equal to a number of columns.

The cost-table composer, may determine a dummy cost value corresponding to a difference of the number of rows and the number of columns to be "0," if the number of rows is different from the number of columns.

The foregoing and/or other aspects and utilities of the present general inventive concept may also be achieved by providing a job assignment apparatus to use in an automatic material-handling system to assign a plurality of jobs to a plurality of vehicles, including a cost-table composer to initially configure a cost table that uses costs corresponding to the vehicles and the jobs, a first optimum solution calculator to calculate an optimum solution by applying a Hungarian algorithm to the costs of the cost table, a statistical-data calculator to calculate statistical data associated with the initial optimum solution and costs of the initial cost table, a cost table converter to convert the initial cost table using the calculated statistical data, and a second optimum solution calculator to acquire a single optimum solution by applying the Hungarian algorithm to the costs of the converted cost table.

The statistical-data calculator may calculate the statistical data if a plurality of initial optimum solutions exist.

The statistical-data calculator may calculate a normalized cost using the initial optimum solution and the costs of the initial cost table, such that it determines any one of the initial optimum solutions using the normalized cost.

The statistical-data calculator may calculate the normalized cost ($\delta_{ij}$), and calculates a new cost ($NC_{ij}$) by adding the normalized cost ($\delta_{ij}$) to each cost of the initially-configured cost table using the following Equation:

$$NC_{ij} = C_{ij} + \delta_{ij}$$

$$\delta_{ij} = (C_{ij} - \mu)^2 / R^2, \; 0 \leq \delta_{ij} \leq 1$$

where $\mu$ is an average cost of the initial optimum solution, and R is a range of total costs ($C_{ij}$).

The foregoing and/or other aspects and utilities of the present general inventive concept may also be achieved by providing a job assignment method of assigning a plurality of jobs to a plurality of vehicles in an automatic material-handling system, the method including configuring an initial cost table using costs corresponding to the vehicles and the jobs, calculating an optimum solution by applying a Hungarian algorithm to the costs of the initial cost table, calculating statistical data associated with the initial optimum solution and costs of the initial cost table, converting the costs of the initial cost table into other costs using the calculated statistical data, and calculating a single optimum solution by applying the Hungarian algorithm to the costs of the converted cost table.

The method may further include calculating the statistical data if the number of the initial optimum solutions is a plural number.

The statistical data may include the initial optimum solution and a normalized cost acquired from the costs of the initial cost table.

The statistical data may include a normalized cost and a new cost denoted by the sum of the normalized cost ($\delta_{ij}$) and each cost of the initial cost table.

The configuring may allow the number of rows of the cost table to be equal to the number of columns.

The method may further include if the number of rows of the initial cost table is different from the number of columns, determining a dummy cost value corresponding to a difference of the number of rows and the number of columns to be "0."

The foregoing and/or other aspects and utilities of the present general inventive concept may also be achieved by providing a computer readable recording medium having embodied thereon a computer program to execute a method of assigning a plurality of jobs to a plurality of jobs to a plurality of vehicles in an automatic material-handling system, wherein the method includes configuring an initial cost table using costs corresponding to the vehicles and the jobs, calculating an optimum solution by applying a Hungarian algorithm to the costs of the initial cost table, calculating statistical data associated with the initial optimum solution and costs of the initial cost table, converting the costs of the initial cost table into other costs using the calculated statistical data, and calculating a single optimum solution by applying the Hungarian algorithm to the costs of the converted cost table.

BRIEF DESCRIPTION OF THE DRAWINGS

These and/or other aspects and utilitites of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
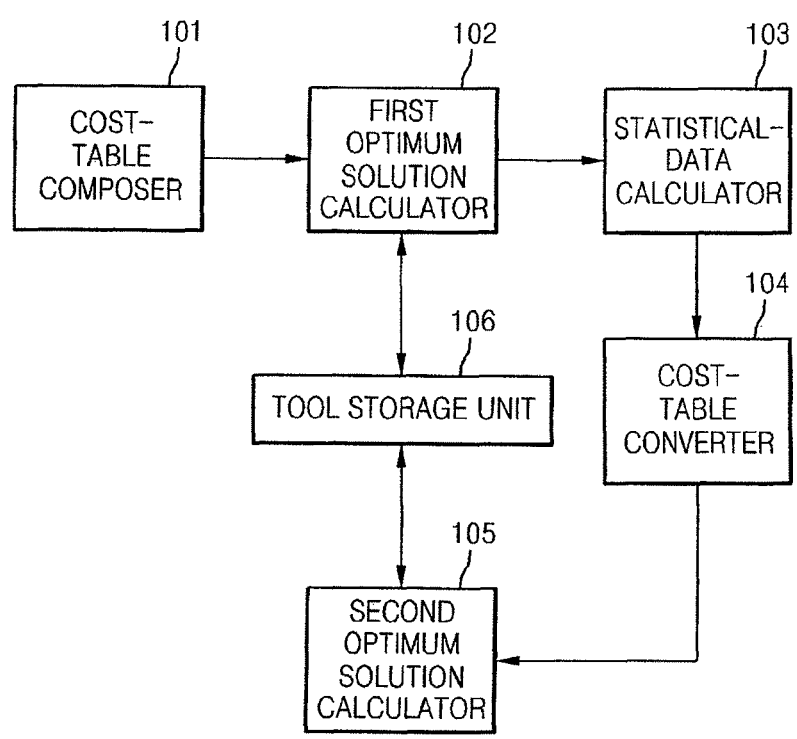
FIG. 1 is a block diagram illustrating a job assignment device in an automatic material-handling system according to an embodiment of the present general inventive concept.

Reference will now be made in detail to the embodiments of the present general inventive concept, examples of which are illustrated in the accompanying drawings, wherein like reference numerals refer to like elements throughout. The embodiments are described below to explain the present general inventive concept by referring to the figures.

A job assignment device according to an embodiment of the present general inventive concept configures a cost table, and uses the Hungarian method to acquire an optimum solution to assign a plurality of jobs to a plurality of vehicles. The cost table numerically indicates a cost of conducting a plurality of jobs. Accordingly, a representative example of the cost is determined by a job-time or working-time required to conduct the job assigned to the vehicle. Furthermore, if a job line assigns a production model and a worker, the cost indicates the job-time or working-time. When installing inner devices of a factory to four proposed sites, the cost indicates the installation costs. When a conveyance line assigns workers to individual processes, the cost indicates the job-time or working-time.

When calculating the optimum solution to minimize overall costs from the cost table that are configured on the assumption that a predetermined job is assigned to a predetermined vehicle, a following Equation 1 must be satisfied to apply the Hungarian method.

$$\text{Minimize} \sum_{i=1}^{N} \sum_{j=1}^{M} C_{ij} x_{ij} \qquad \text{[Equation 1]}$$

Subject to $$\sum_{i=1}^{N} x_{ij} = 1$$

$$\sum_{j=1}^{M} x_{ij} = 1$$

$$x_{ij} = 0, 1 \quad i = 1, \ldots, N, \; j = 1, \ldots, M$$

where $C_{ij}$ represents a cost of a vehicle (i) assigned to job (j), $x_{ij}$ represents a vehicle (i) assigned to the job (j), N represents a number of vehicles, and M represents a number of jobs.

If the job assignment device for use in the automatic material-handling system according to the present general inventive concept satisfies the Equation (1), the job assignment device may include a cost table composer 101 to compose a cost table as illustrated in FIG. 1. Accordingly, the cost table may allow a number of rows to be equal to the number of columns. If the number of rows is different from the number of columns, the job assignment device determines a dummy cost value to be "0".

A tool storage unit 106 includes a tool capable of acquiring the optimum solution. In this case, the tool includes a specific process of calculating the optimum solution using the Hungarian method.

Upon receiving the cost table from the cost table composer 101, a first optimum solution calculator 102 can receive the tool stored in the tool storage unit 106, and can calculate an initial optimum solution using the received tool.

Accordingly, a method of calculating the initial optimum solution using the above-mentioned Hungarian method will hereinafter be described with reference to a following Example (1):

EXAMPLE 1

An Automatic Guided Vehicle (AGV) system may configure a following first table on a basis of individual cost matrices capable of assigning five jobs (J1, J2, J3, J4, and J5) to five vehicles (V1, V2, V3, V4, and V5), respectively. Accordingly, a Table 1 illustrates a 5×5 matrix formed by a plurality of cost values.

TABLE 1

| Vehicle | Job | | | | |
|---|---|---|---|---|---|
| | $J_1$ | $J_2$ | $J_3$ | $J_4$ | $J_5$ |
| $V_1$ | 3 | 1 | 16 | 11 | 17 |
| $V_2$ | 3 | 9 | 20 | 3 | 11 |
| $V_3$ | 14 | 13 | 8 | 6 | 11 |
| $V_4$ | 10 | 16 | 16 | 15 | 22 |
| $V_5$ | 3 | 7 | 11 | 2 | 16 |

With reference to the Table 1, individual minimum cost values (1, 3, 6, 10, and 2) that correspond to each of a plurality of rows (first through fifth), respectively, are deducted from each respective row to produce a Matrix 1 below. Accordingly, the minimum cost value of 1 is deducted from every value in the first row of Table 1, the minimum cost value of 3 is deducted from every value in the second row of Table 1, the minimum cost value of 6 is deducted from every value in the third row of Table 1, the minimum cost value of 10 is deducted from every value in the fourth row of Table 1, and the minimum cost value of 2 is deducted from every value in the fourth row of Table 1. Accordingly, the following Matrix 1 is produced.

[Matrix 1]

| 2 | 0 | 15 | 10 | 16 |
|---|---|---|---|---|
| 0 | 6 | 17 | 0 | 8 |
| 8 | 7 | 2 | 0 | 5 |
| 0 | 6 | 6 | 5 | 12 |
| 1 | 5 | 9 | 0 | 14 |

With reference to the Matrix 1, individual minimum cost values (0, 0, 2, 0, and 5) that correspond to each of a plurality of columns (first through fifth), respectively, are deducted from each respective row to produce a Matrix 2 provided below. Accordingly, the minimum cost value of 0 is deducted from every value in the first column of Matrix 1, the minimum cost value of 0 is deducted from every value in the second column of Matrix 1, the minimum cost value of 2 is deducted from every value in the third column of Matrix 1, the minimum cost value of 0 is deducted from every value in the fourth column of Matrix 1, and the minimum cost value of 5 is deducted from every value in the fourth column of Matrix 1. Accordingly, the following Matrix 2 is produced.

[Matrix 2]

| 2 | 0 | 13 | 10 | 11 |
|---|---|---|---|---|
| 0 | 6 | 15 | 0 | 3 |
| 8 | 7 | 0 | 0 | 0 |
| 0 | 6 | 4 | 5 | 7 |
| 1 | 5 | 7 | 0 | 9 |

With reference to the Matrix 2, the rows and columns that possess "0" values are denoted by horizontal and vertical lines, to produce a Matrix 3 provided below. The horizontal and vertical lines are drawn in such a way to cover all the "0" values using as few lines as possible.

[Matrix 3]

| 2 | 0 | 13 | 0 | 11 |
|---|---|---|---|---|
| 0 | 6 | 15 | 0 | 3 |
| 8 | 7 | 0 | 0 | 0 |
| 0 | 6 | 4 | 5 | 7 |
| 1 | 5 | 7 | 0 | 9 |

With reference to the Matrix 3, a minimum cost value (e.g., a cost value of "3" as illustrated in Matrix 3) is deducted from all the cost values which are not crossed-out by a line to product a Matrix 4.

[Matrix 4]

| 1 | 0 | 13 | 0 | 11 |
|---|---|---|---|---|
| 0 | 3 | 12 | 0 | 0 |
| 8 | 7 | 0 | 0 | 0 |
| 0 | 3 | 1 | 5 | 4 |
| 1 | 2 | 4 | 0 | 6 |

Positions of the "0" values denote possible optimum assignment combinations, with each row requiring only one "0" value. Furthermore, more than one optimum assignment combination may be found, but a total minimum value must be the same in every combination. With reference to the Matrix 4 and the Table 1, the optimum assignment combination includes cost values corresponding to the Table 1 positions (V1,J2), (V2,J5), (V3,J3), (V4,J 1), and (V5,J4), respectively. A total minimum cost of the Table 1 is equal to a sum of the cost values corresponding to the Table 1 positions (V1,J2), (V2,J5), (V3,J3), (V4,J1), and (V5,J4), respectively. Therefore, the sum of the cost values equals "1"+"11"+"8"+"10"+"2", which equals "32."

As can be seen from the above-mentioned Example 1, the present general inventive concept can guarantee the optimum solution from the optimum assignment combination, using the Hungarian method.

However, if there are a plurality of optimum assignment combinations, it is impossible to guarantee which of the optimum assignment combinations is a best optimum assignment combination to produce the optimum solution.

To guarantee the best optimum assignment combination, the job assignment device to perform the automatic material-handling of FIG. 1 includes a statistical-data calculator 103, a cost-table converter 104, and a second optimum solution calculator 105. The statistical-data calculator 103 calculates an amount of statistical data. The cost-table converter 104 converts the cost of the cost table initially-configured on the basis of the statistical data calculated by the statistical-data calculator 103. The second optimum solution calculator 105 receives the cost table converted by the cost-table converter 104, and calculates a single optimum solution using the Hungarian algorithm. A detailed description thereof will hereinafter be described with reference to an Example 2 below.

EXAMPLE 2

If a plurality of optimum assignment combinations are detected when the Hungarian algorithm is used to find the optimum solution in the automatic material-handling system capable of transferring a variety of articles using vehicles, there is a need to determine which one of the optimum assignment combinations is the best optimum assignment combination.

Figure 2:
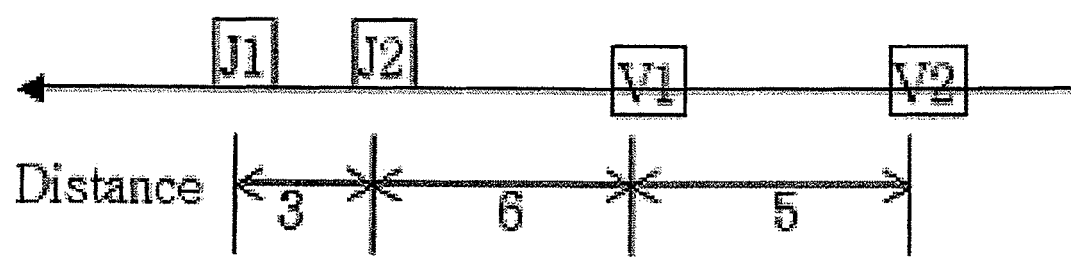
FIG. 2 illustrates exemplary job assignment of the automatic material-handling system according to an embodiment of the present general inventive concept, and illustrates a layout provided when two vehicles and two jobs are contained in a single path of an AGV system according to an embodiment of the present general inventive concept.

For example, as illustrated in FIG. 2, if two vehicles (V1, V2) and two jobs (J1, J2) exist in a single path of the AGV system, a distance is used as the cost.

If the above-mentioned situation satisfies the Equation (1), the following table 2 is configured by the cost table composer 101.

TABLE 2

| Vehicle | Job | |
|---|---|---|
| | $J_1$ | $J_2$ |
| $V_1$ | 9 | 6 |
| $V_2$ | 14 | 11 |

The optimum assignment combinations acquired from the Table 2 by the Hungarian algorithm are (V1,J2) (V2,J1), and (V1,J1)(V2,J2). It is impossible to recognize which one of the above-mentioned two pairs of corresponding initial optimum solutions acquired by the Hungarian algorithm is the best solution. For example, if the first combination (V1,J2) (V2, J1) is determined to be the optimum solution, the second vehicle V2 should be in a standby mode while the first vehicle V1 conducts the second job J2, and can occupy a job path after the first vehicle V1 terminates the second job J2, such that the second vehicle V2 conducts the first job J1, resulting in the occurrence of a job delivery time.

If several optimum solutions are present as illustrated in the Table 2, there is a need to calculate the optimum solution using the statistical data. Accordingly, if a specific optimum solution from among several initial optimum solutions has a minimum standard deviation, the above-mentioned specific optimum solution may be determined to be the best optimum solution.

The statistical-data calculator 103 calculates an average cost (μ) of the initial optimum solutions and the range R of total costs ($C_{ij}$) using a following Equation 2:

$$\mu = TC/n, \; n = \min\{M, N\}$$

$$R = C_{max} - C_{min} \quad \text{[Equation 2]}$$

With reference to Equation 2, TC represents a total cost of the initial optimum solutions acquired by the Hungarian algorithm, n is a smaller one of a number (M) of columns and a number (N) of rows, $C_{max}$ represents a maximum value of the total costs, and $C_{min}$ represents a minimum value of the total costs.

The statistical-data calculator 103 calculates the normalized cost ($\delta_{ij}$), and calculates a new cost ($NC_{ij}$) by adding the normalized cost ($\delta_{ij}$) to each cost of the initially-configured cost table using a following Equation 3:

$$NC_{ij} = C_{ij} + \delta_{ij}$$

$$\delta_{ij} = (C_{ij} - \mu)^2 / R^2, \; 0 \le \delta_{ij} \le 1 \quad \text{[Equation 2]}$$

The cost-table converter 104 converts the cost table into another table on a basis of the new cost ($NC_{ij}$) which is calculated by the statistical-data calculator 103.

Figure 3:
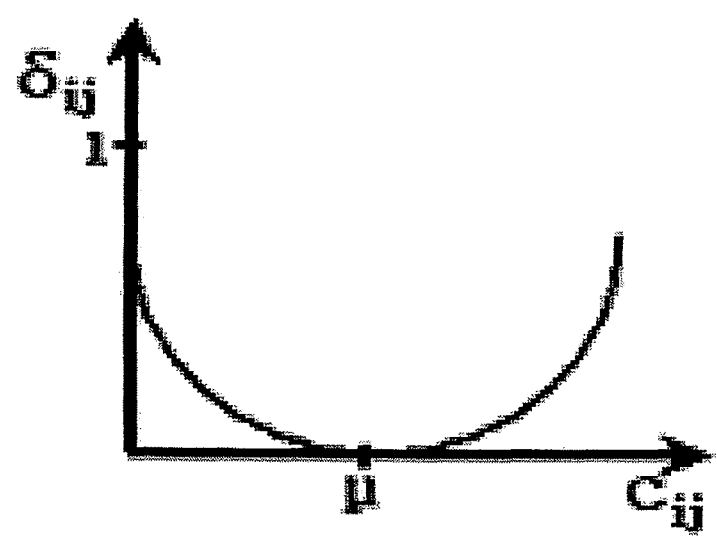
FIG. 3 is a graph illustrating a normalized cost ($\delta_{ij}$) that acts as statistical data of an embodiment of the present general inventive concept, in which the normalized cost ($\delta_{ij}$) becomes lower as it approaches an average cost ($\mu$), and becomes higher as it moves away from the average cost ($\mu$)

The second optimum solution calculator 105 can calculate a single optimum solution by adapting the Hungarian algorithm to the converted cost table. Referring to FIG. 3, the closer the value of $C_{ij}$ is to the average cost (μ), the lower the normalized cost ($\delta_{ij}$). The longer the distance between the value ($C_{ij}$) and the average cost (μ), the higher the normalized cost ($\delta_{ij}$). As a result, the single optimum solution can be acquired from the converted cost table.

If there are a plurality of initial optimum solutions, a minimum value of the standard deviation may be used as a solution, and a detailed description thereof will hereinafter be described.

The converted cost table may be configured by the average cost (μ) and the range (R) when A+D=B+C, as represented by a following Equation 4:

$$\begin{bmatrix} A & B \\ C & D \end{bmatrix} \begin{bmatrix} A + (A-\mu)^2/R^2 & B + (B-\mu)^2/R^2 \\ C + (C-\mu)^2/R^2 & D + (D-\mu)^2/R^2 \end{bmatrix} \quad \text{[Equation 4]}$$

A sum of values in a diagonal direction may be compared with another sum of values in another diagonal direction, as represented by a following Equation 5:

$$(A + (A-\mu)^2/R^2 + D + (D-\mu)^2/R^2) - \quad \text{[Equation 5]}$$
$$(B + (B-\mu)^2 R^2 + C + (C-\mu)^2/R^2) =$$
$$(A + D - B - C) +$$
$$1/R^2((A-\mu)^2 + (D-\mu)^2 - (B-\mu)^2 - (C-\mu)^2) =$$
$$1/R^2(A^2 + D^2 - B^2 - C^2) + 2\mu(A + D - B - C)) =$$
$$1/R^2(A^2 + D^2 - B^2 - C^2) < 0$$
$$\text{if } |A - D| < |B - C|$$

If a specific condition of |A−D|<|A−D| is provided when A+D=B+C, then $A^2+D^2<B^2+C^2$ is acquired, as represented by a following Equation 6:

i) $(A + D)^2 = (B + C)^2$ [Equation 6]

$A^2 + 2AD + D^2 - B^2 - 2BC - C^2 = 0$ ii) $(|A - D|)^2 - (|B - C|)^2 < 0$ $A^2 - 2AD + D^2 - B^2 + 2BC - C^2 < 0$ iii) i) + ii)

$2(A^2 + D^2 - B^2 - C^2) < 0$

∴ $A^2 + D^2 < B^2 + C^2$

Therefore, the values A and D of Equation 6 are determined to be optimum solutions.

A method of calculating a single optimum solution by applying the above-mentioned method illustrated in Equations 4, 5, and 6 to the Table 2 will hereinafter be described.

The first optimum solution calculator 102 may calculate the initial optimum solution corresponding to (V1,J2) and (V2,J1).

The statistical-data calculator 103 may calculate the average cost ($\mu$) and the range R of total costs ($C_{ij}$) using the following Equation 7:

$$\mu=(6+14)/2=10$$

$$R=14-6=8 \quad \text{[Equation 7]}$$

The cost-table converter 104 converts the initial cost table into another cost table on a basis of the average cost ($\mu$), the range R of total costs ($C_{ij}$), and the new cost ($NC_{ij}$) that is denoted by the sum of the normalized cost ($\delta_{ij}$) and each cost of the initially-configured cost table to produce a following Table 3:

TABLE 3

| Vehicle | Job | |
|---|---|---|
| | $J_1$ | $J_2$ |
| $V_1$ | 9 + 1/64 | 6 + 16/64 |
| $V_2$ | 14 + 16/64 | 11 + 1/64 |

The second optimum solution calculator 105 can calculate the optimum solution by adapting the Hungarian algorithm to the cost shown in Table 3, such that the optimum assignment combination denoted by (V2,J1) and (V1,J2) is acquired.

A more detailed explanation of the above-mentioned example will hereinafter be described with reference to a following Example 3:

EXAMPLE 3

Figure 4:
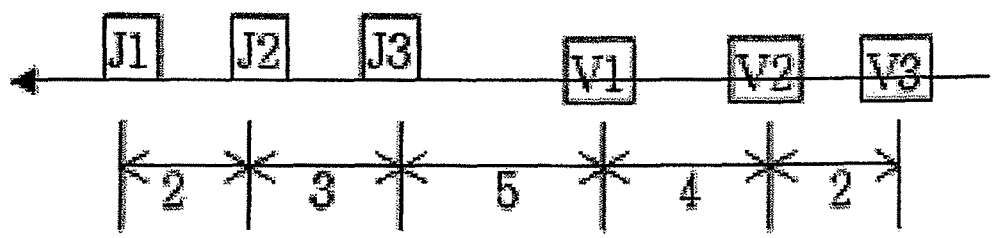
FIG. 4 illustrates an exemplary job assignment of the automatic material-handling system according to the present general inventive concept, and illustrates a layout provided when three vehicles and three jobs are contained in a single path of an AGV system according to an embodiment of the present general inventive concept.

As illustrated in FIG. 4, if three vehicles V1, V2, and V3 and the three jobs J1, J2 and J3 are present in a single path of the AGV system, the distance is set as the cost.

If the Equation 1 is satisfied when the job is assigned to the cost, the cost-table composer 101 configures a following Table 4:

TABLE 4

| Vehicle | Job | | |
|---|---|---|---|
| | $J_1$ | $J_2$ | $J_3$ |
| $V_1$ | 10 | 8 | 5 |
| $V_2$ | 14 | 12 | 9 |
| $V_3$ | 16 | 15 | 11 |

The first optimum solution calculator 102 can calculate the initial optimum solution using the Hungarian algorithm received from the tool storage unit 106 to acquire the initial optimum solution denoted by (V1,J3), (V2,J1), and (V3,J2).

The statistical-data calculator 103 calculates the average cost ($\mu$) and the range R of total costs ($C_{ij}$) using a following Equation 8:

$$\mu=(5+14+15)/3=11$$

$$R=16-5=11 \quad \text{[Equation 8]}$$

The cost-table converter 104 can convert the initial cost table into another cost table on a basis of the average cost ($\mu$), the range R of total costs ($C_{ij}$), and the new cost ($NC_{ij}$) that is denoted by the sum of the normalized cost ($\delta_{ij}$) and each cost of the initially-configured cost table, to produce a following Table 5:

TABLE 5

| Vehicle | Job | | |
|---|---|---|---|
| | $J_1$ | $J_2$ | $J_3$ |
| $V_1$ | 10 + 1/121 | 8 + 9/121 | 5 + 36/121 |
| $V_2$ | 14 + 9/121 | 12 + 1/121 | 9 + 4/121 |
| $V_3$ | 16 + 25/121 | 15 + 16/121 | 11 + 0/121 |

The second optimum solution calculator 105 can calculate the optimum solution by adapting the Hungarian algorithm to the cost illustrated in Table 5, such that the optimum assignment combination denoted by (V1,J1), (V2,J2), and (V3,J3) is acquired.

Figure 5:
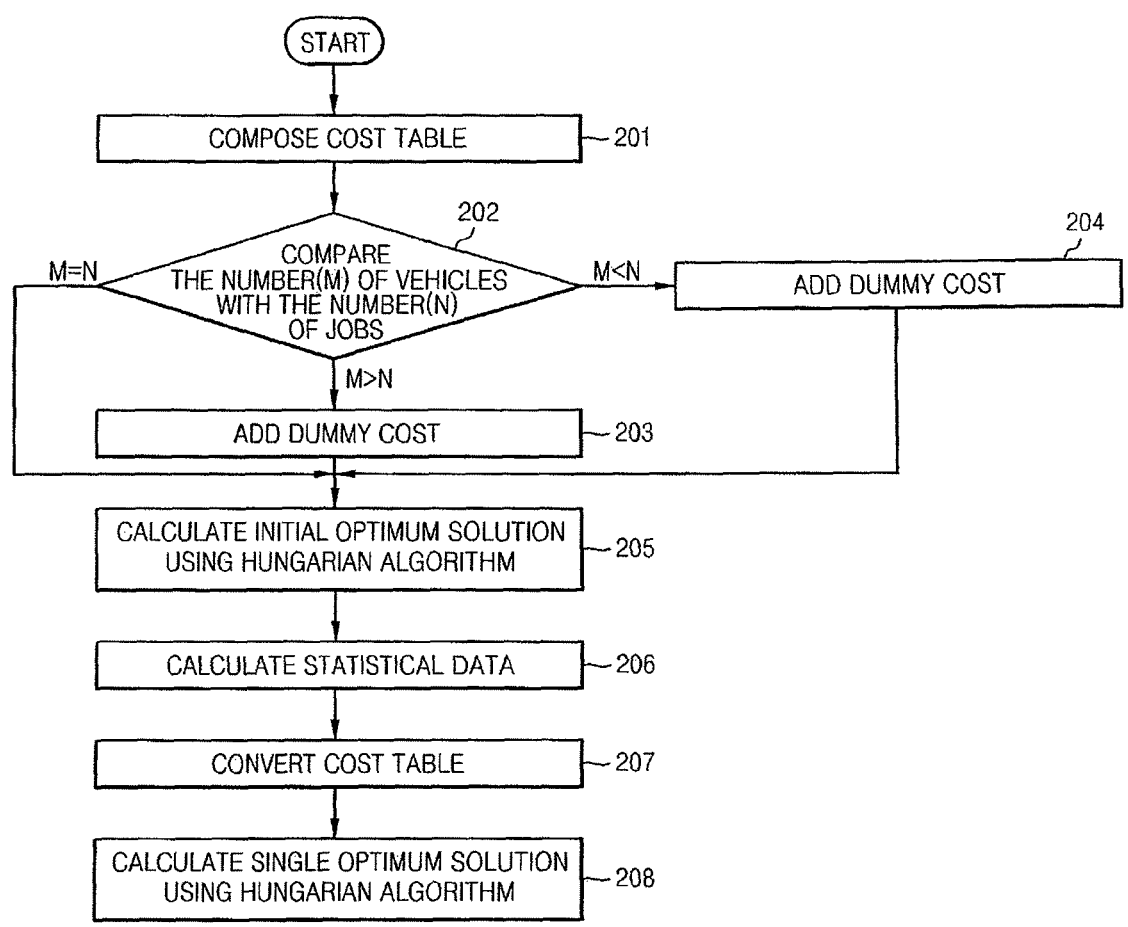
FIG. 5 is a flow chart illustrating a job assignment method to use in an automatic material-handling system according to an embodiment of the present general inventive concept.

A method of assigning a plurality of jobs to a plurality of vehicles will hereinafter be described with reference to FIG. 5.

If the job cost can be represented by the above-mentioned Equation 1, the cost table is configured in operation 201. Accordingly, the cost table compares a number M of vehicles with a number N of jobs in operation 202. If the number M of vehicles is greater than the number N of jobs, a dummy cost value corresponding to a number (M−N) is set to "0" in operation 203. If the number M of vehicles is greater than the number N of jobs, a dummy cost value corresponding to a number (N−M) is set to "0" in operation 204.

If the number M of vehicles is equal to the number N of jobs, or if the dummy cost is determined, the first optimum solution calculator 102 calculates the initial optimum solution using the Hungarian algorithm stored in the tool storage unit 106 in operation 205.

The statistical-data calculator 103 calculates statistical data on a basis of the cost of the initial cost table and the initial optimum solution. The statistical data is adapted to calculate a solution having a smaller standard deviation based on a condition that there are a plurality of optimum solutions. The statistical data includes the average cost ($\mu$), the range R of total costs ($C_{ij}$), and the new cost ($NC_{ij}$) denoted by the sum of the normalized cost ($\delta_{ij}$) and each cost of the initially-configured cost table in operation 206.

The cost-table converter 104 converts the initial cost table into another cost table using the above-mentioned statistical data in operation 207, and a detailed description thereof has already been described in the Examples 2 and 3.

The second optimum solution calculator 104 calculates a single optimum solution by applying the Hungarian algorithm to the cost table in operation 208.

Figure 6:
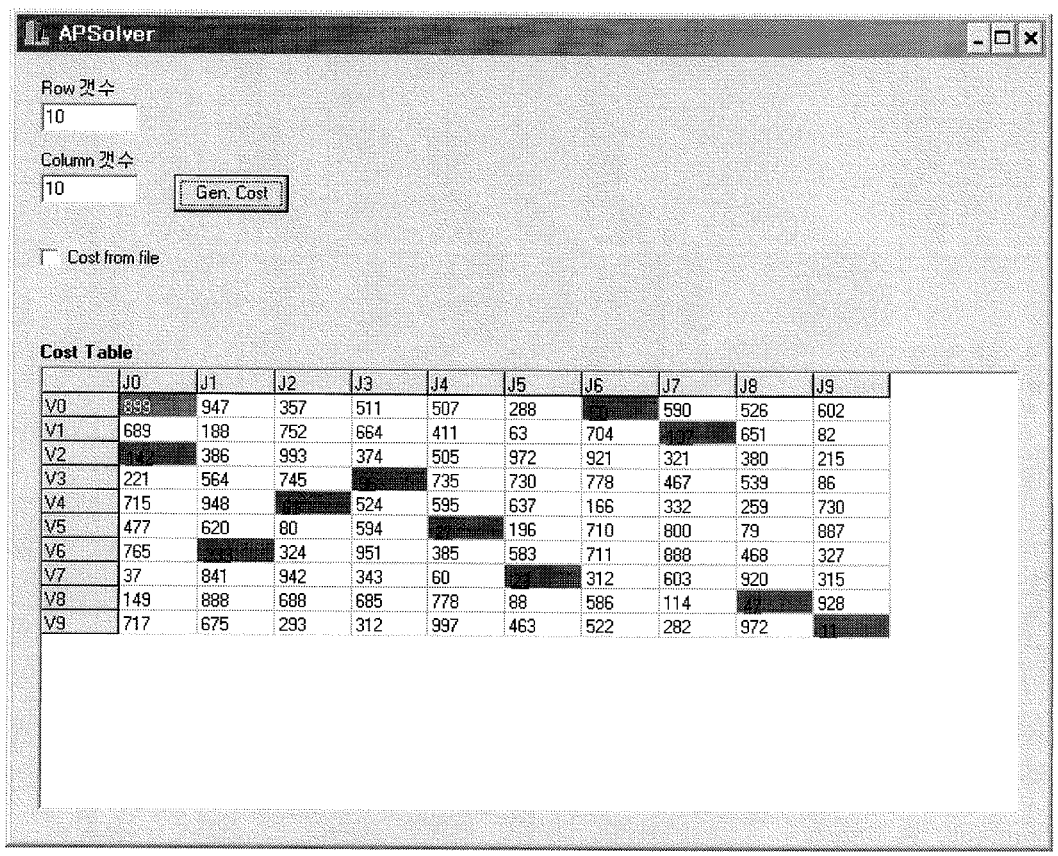
FIG. 6 illustrates an exemplary display screen illustrating a method of performing a simulation using an APSolver program to acquire a single optimum solution according to an embodiment of the present general inventive concept.

Accordingly, the method of calculating the single optimum solution using the statistical data after calculating the initial optimum solution according to an embodiment the present general inventive concept is superior to the conventional art, because its simulation result based on the APSolver program is superior to that of the conventional art, as can be seen from FIG. 6. Accordingly, the number of simulations may be equal to or higher than a million times.

The present general inventive concept can also be embodied as computer-readable codes on a computer-readable recording medium. The computer-readable recording medium is any data storage device that can store data which can be thereafter read by a computer system. Examples of the computer-readable recording media include read-only memory (ROM), random-access memory (RAM), CD-ROMs, magnetic tapes, floppy disks, optical data storage devices, and carrier waves (such as data transmission through the Internet). The computer-readable recording medium can also be distributed over network-coupled computer systems so that the computer-readable code is stored and executed in a distributed fashion. Also, functional programs, codes, and code segments to accomplish the present general inventive concept can be easily construed by programmers skilled in the art to which the present general inventive concept pertains.

As is apparent from the above description, a job assignment apparatus according to an embodiment the present general inventive concept can calculate an optimum solution using the Hungarian algorithm when jobs are assigned to vehicles of an AGV system.

If there are several initial optimum solutions, the job assignment apparatus can calculate a single optimum solution by applying the Hungarian algorithm to a cost table that is converted by statistical data. Accordingly, interference between vehicles is reduced, and efficiency of a material-handling system increases. Particularly, a job assignment apparatus can effectively cope with job swapping problems when a job assignment is not optimized.

Although a few embodiments of the present general inventive concept have been shown and described, it would be appreciated by those skilled in the art that changes may be made in these embodiments without departing from the principles and spirit of the general inventive concept, the scope of which is defined in the claims and their equivalents.

What is claimed is:

1. A job assignment apparatus to use in an automatic material-handling system to assign a plurality of jobs to a plurality of vehicles, comprising:
a computer;
a cost-table composer to configure a cost table using costs corresponding to the vehicles and the jobs; and
a first optimum solution calculator to calculate optimum solutions by applying a Hungarian algorithm to the costs of the cost table; and
a second optimum solution calculator to calculate a single optimum solution based on statistical data associated with the optimum solutions and the costs of the cost table if the calculation from the first optimum solution calculator produces a plurality of optimum solutions, such that the statistical data includes a normalized cost and a new cost denoted by a sum of the normalized cost and each cost of the cost table.

2. The apparatus according to claim 1, further comprising: a tool storage unit to store the Hungarian algorithm.

3. The apparatus according to claim 1, wherein the cost-table composer configures the cost table if the following equation is satisfied:

$$\text{Minimize} \sum_{i=1}^{N} \sum_{j=1}^{M} C_{ij} x_{ij}$$

Subject to $$\sum_{i=1}^{N} x_{ij} = 1$$

$$\sum_{j=1}^{M} x_{ij} = 1$$

$$x_{ij} = 0, 1 \quad i = 1, \ldots, N, \, j = 1, \ldots, M$$

where $C_{ij}$ represents a cost of a vehicle (i) that is assigned to a job (j), $x_{ij}$ represents the vehicle (i) that is assigned to the job (j), N represents a number of vehicles, and M represents a number of jobs.

4. The apparatus according to claim 3, wherein the cost-table composer allows a number of rows of the cost table to be equal to a number of columns.

5. The apparatus according to claim 4, wherein the cost-table composer determines a dummy cost value corresponding to a difference of the number of rows and the number of columns to be "0", if the number of rows is different from the number of columns.

6. A job assignment apparatus to use in an automatic material-handling system to assign a plurality of jobs to a plurality of vehicles, comprising:
a computer;
a first optimum solution calculator to calculate optimum solutions by applying a Hungarian algorithm to the costs of the cost table;
a statistical-data calculator to calculate statistical data associated with the optimum solutions and costs of the initial cost table, such that the calculated statistical data includes a normalized cost and a new cost denoted by a sum of the normalized cost and each cost of the cost table;
a cost table converter to convert the initial cost table using the calculated statistical data; and
a second optimum solution calculator to acquire a single optimum solution by applying the Hungarian algorithm to the costs of the converted cost table.

7. The apparatus according to claim 6, wherein the statistical-data calculator calculates the statistical data if a plurality of optimum solutions exist.

8. The apparatus according to claim 7, wherein the statistical-data calculator calculates a normalized cost using the optimum solution and the costs of the initial cost table, such that the statistical data-calculator determines any one of the optimum solutions using the normalized cost.

9. The apparatus according to claim 8, wherein the statistical-data calculator calculates the normalized cost ($\delta_{ij}$), and calculates a new cost ($NC_{ij}$) by adding the normalized cost ($\delta_{ij}$) to each cost of the initially-configured cost table using the following Equation:

$$NC_{ij} = C_{ij} + \delta_{ij}$$

$$\delta_{ij} = (C_{ij} - \mu)^2 / R^2, \, 0 \le \delta_{ij} \le 1$$

where $\mu$ is an average cost of the initial optimum solution, and R is a range of total costs ($C_{ij}$).

10. A job assignment method of a computer of assigning a plurality of jobs to a plurality of vehicles in an automatic material-handling system, the method comprising:
configuring an initial cost table using costs corresponding to the vehicles and the jobs;
calculating optimum solutions by applying a Hungarian algorithm to the costs of the initial cost table;
calculating statistical data associated with the optimum solutions and costs of the initial cost table, such that the calculated statistical data includes a normalized cost and a new cost denoted by a sum of the normalized cost and each cost of the cost table;
converting the costs of the initial cost table into other costs using the calculated statistical data; and
calculating a single optimum solution by applying the Hungarian algorithm to the costs of the converted cost table.

11. The method according to claim 10, further comprising: calculating the statistical data if a number of the optimum solutions is a plural number.

12. The method according to claim 11, wherein the statistical data includes the optimum solutions and the normalized cost acquired from the costs of the initial cost table.

13. The method according to claim 11, wherein the normalized cost is denoted by $\delta_{ij}$.

14. The method according to claim 10, wherein the configuring allows a number of rows of the cost table to be equal to a number of columns.

15. The method according to claim 14, further comprising:
if the number of rows of the initial cost table is different from the number of columns, determining a dummy cost value corresponding to a difference of the number of rows and the number of columns to be "0".

* * * * *